United States Patent
Howe et al.

(10) Patent No.: US 6,706,467 B2
(45) Date of Patent: Mar. 16, 2004

(54) COATING FLUID FOR IMAGING ELEMENT COMPRISING SOLUBILIZED COLLAGEN GELATIN COLLOIDAL DISPERSION

(75) Inventors: Andrew M. Howe, Watford (GB); Richard W. Connelly, Rochester, NY (US); James S. Honan, Spencerport, NY (US); Lloyd A. Lobo, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/158,651

(22) Filed: May 30, 2002

(65) Prior Publication Data

US 2003/0224301 A1 Dec. 4, 2003

(51) Int. Cl.$^7$ ............................. G03C 1/407; C07K 1/00
(52) U.S. Cl. ......................... 430/449; 430/466; 430/537; 430/539; 430/622; 430/621; 430/642; 106/160.1; 530/354; 530/355
(58) Field of Search ................................. 430/642, 621, 430/67.2, 539, 449, 466, 537; 106/160.1; 530/354, 355

(56) References Cited

U.S. PATENT DOCUMENTS

| | | | | |
|---|---|---|---|---|
| 4,360,590 A | * | 11/1982 | Tomka | 430/642 |
| 4,824,939 A | | 4/1989 | Simpson | 530/355 |
| 5,236,822 A | | 8/1993 | Riecke et al. | 430/623 |
| 5,731,134 A | | 3/1998 | Honan et al. | 430/642 |
| 5,908,921 A | | 6/1999 | LaRoche et al. | 530/354 |
| 5,919,906 A | | 7/1999 | Rowlands et al. | 530/354 |
| 5,958,660 A | | 9/1999 | Taylor et al. | 430/622 |
| 5,962,210 A | | 10/1999 | Hahm et al. | 430/567 |
| 6,080,843 A | | 6/2000 | Rainville et al. | 530/355 |
| 6,100,381 A | | 8/2000 | Rowlands et al. | 530/355 |

FOREIGN PATENT DOCUMENTS

EP          971 262    *    1/2000

OTHER PUBLICATIONS

Andrew M. Howe, Andrew Clarke, and Thomas H. Whitesides; "Viscosity Of Emulsions Of Polydisperse Droplets With A Thick Adsorbed Layer"; Langmuir; 1997; vol. 13; pp. 2617–2626.

Michael Dreja, Kurt Heine, Bernd Tieke and Gunter Junkers; "Effects Of Functionalized Latex Particles And Anionic Surfactants On The Flow Behavior Of Aqueous Gelatin Dispersions"; Journal Of Colloid And Interface Science; 1997; vol. 191; pp. 131–140.

K. Abraham Vaynberg, Norman J. Wagner, Ravi Sharma, and Peter Martic; "Structure And Extent Of Adsorbed Gelatin On Acrylic Latex And Polystyrene Colloidal Particles"; Journal Of Colloid And Interface Science; 1998; vol. 205; pp. 131–140.

K. Abraham Vaynberg and Norman J. Wagner; "Rheology Of Polyampholyte (Gelatin)–Stabilized Colloidal Dispersions: The Tertiary Electroviscous Effect"; Journal Rheology; 2001; vol. 45; pp. 451–466.

John H.E. Hone, Andrew M. Howe, and Thomas H. Whitesides; "Rheology Of Polystyrene Latexes With Adsorbed And Free Gelatin"; Colloids And Surfaces A: Physicochemical And Engineering Aspects; 2000; vol. 161; pp. 283–306.

U.S. patent application No. 10/158,681; filed May 30, 2002; of Andrew M. Howe, Lloyd A. Lobo, and Gary L. Santee; titled "Coating Fluid For Imaging Element Comprising Solubilized Collagen Gelatin And Hardener".

U.S. patent application No. 10/158,656; filed May 30, 2002; of Lloyd A. Lobo, Hwei–Ling Yau, James S. Honan and Paul T. Hahm; titled "Imaging Element Comprising Solubilized Collagen Gelatin And Hardener".

* cited by examiner

Primary Examiner—Richard Schilling
(74) Attorney, Agent, or Firm—Andrew J. Anderson

(57) ABSTRACT

An aqueous coating fluid is described comprising gelatin at a concentration of at least 1 wt % and a colloidal particle dispersed material phase at a volume fraction of at least 0.01, wherein at least 20% of the gelatin comprises a gelatin prepared from hydrolysis of ossein using sodium or potassium hydroxide. The present invention enables increasing the concentrations of a coating fluid containing gelatin and dispersed sub-micron colloidal materials, reducing the size of the sub-micron colloidal materials in such a coating fluid, and/or including higher molecular weight gelatin in such a coating fluid without detrimentally increasing the viscosity of such fluids. The invention further enables reducing the viscosity of an aqueous coating fluid containing gelatin and dispersed insoluble colloidal material, without needing to reduce the concentration of gelatin or colloidal materials, increase the size of the sub-micron colloidal materials, and/or reduce the molecular weight of the gelatin. Each such advantage may be achieved either individually, or in combinations to varying extents, without the need to fundamentally change the composition of the materials in the coating fluid.

14 Claims, No Drawings

COATING FLUID FOR IMAGING ELEMENT COMPRISING SOLUBILIZED COLLAGEN GELATIN COLLOIDAL DISPERSION

FIELD OF THE INVENTION

This invention relates to aqueous coating solutions comprising gelatin which is prepared by the hydrolysis of ossein using sodium or potassium hydroxide, where the coating solution contains a colloidal particle dispersed material phase at a volume fraction of at least 0.01.

BACKGROUND OF THE INVENTION

Imaging elements, particularly photographic silver halide imaging elements, commonly use a hydrophilic colloid as a film forming binder for layers thereof, most commonly ossein. The layers of such imaging elements are typically coated employing multilayer slide bead coating processes such as described in U.S. Pat. No. 2,716,419 and multilayer slide curtain coating processes such as described in U.S. Pat. No. 3,508,947. The binder of choice in most cases is gelatin, prepared from various sources of collagen (see, e.g., P. I. Rose, The Theory of Photographic Process, 4th Edition, edited by T. H. James (Macmillan Publishing Company, New York, 1977) p. 51–65). The binder is expected to provide several functions, primarily to provide an element with some level of mechanical integrity and contain all the materials within the imaging element, which are required to provide an image.

The various layers of imaging elements comprising gelatin are typically coated from aqueous coating solutions. In addition to serving as a binder, gelatin also functions as a stabilizer to dispersed aqueous insoluble materials of colloidal dimensions which may also be present in the aqueous coating solutions. Such materials can include photographically-useful materials such as coupler drops, UV-absorbers, scavengers of oxidized developer, silver halide grains, dye particles or materials needed for other functions, such as polymer latexes and silica particles. A colloidal dispersed material particle has at least one dimension in the range 1 nm to 1 $\mu$m. The viscosity of fluids containing gelatin and such colloidal materials is an important parameter affecting the efficiency of the manufacture of imaging materials such as photographic products. The most important impact of viscosity is on the coating process. If the viscosity is too high, then the fluid cannot be pumped sufficiently fast. If the viscosity is too low then defects may arise due to ripple, flow on the web after coating and failure of the multilayer pack to gel thermally (chill set). Coating fluid viscosity increases with gelatin and dispersed phase concentrations, as the mean molecular weight of the gelatin increases, and as the size of dispersed colloidal particles decreases. One of the most expensive processes in manufacturing of multilayer photographic products is drying of water after coating. If the concentration of solids within the coating fluid can be increased, then less water is coated and less drying is required at a given coating speed (or the coating speed can be increased without increasing the throughput capacity of the dryers). However, as the concentration increases, the viscosity of the coating fluid may become too high to pump easily and the coating fluids may exhibit too much shear thinning (viscosity decreasing as shear rate increases) to give uniform laydown across the web.

It is well recognised that the presence of sub-micron colloidal particles increases the viscosity of gelatin solutions. For a given volume fraction of colloidal material, the viscosity increases as the particle size of the colloid is reduced. The affect arises through adsorption of gelatin to the surfaces of the dispersed particles leading to an increase in the effective volume occupied by the colloid. Examples are given, e.g., in the following references: Howe A M, Clarke A and Whitesides T H, "Viscosity of Emulsions of Polydisperse Droplets with a Thick Adsorbed Layer" Langmuir 13:2617–2626 (1997); Dreja M, Heine K, Tieke B and Junkers G, "Effects of functionalized latex particles and anionic surfactants on the flow behavior of aqueous gelatin dispersions" J. Colloid Interface Sci. 191(1):131–140 (1997); Vaynberg K A, Wagner N J, Sharma R and Martic P, "Structure and extent of adsorbed gelatin on acrylic latex and polystyrene colloidal particles" J. Colloid Interface Sci., 205:131–140 (1998); Hone J H E, Howe A M and Whitesides T H, "Rheology of polystyrene latexes with adsorbed and free gelatin" Colloids Surfaces 161:283–306 (2000); Vaynberg K A and Wagner N J, "Rheology of polyampholyte (gelatin)-stabilised colloidal dispersions: The tertiary electroviscous effect" J. Rheology 45(2):451–466 (2001).

For various applications, it would be desirable to be able to increase the concentration of a coating fluid containing gelatin and dispersed sub-micron colloidal materials, reduce the size of the sub-micron colloidal materials in such a coating fluid, and/or enable the inclusion of higher molecular weight gelatin in such a coating fluid without detrimentally increasing the viscosity. For other applications, it would be desirable to be able to reduce the viscosity of an aqueous coating fluid containing gelatin and dispersed insoluble colloidal material without needing to reduce the concentration of gelatin or colloidal materials, increase the size of the sub-micron colloidal materials, and/or reduce the molecular weight of the gelatin. It would further be desirable to be able to make such changes, either singly or in combinations thereof, without fundamentally changing the composition of the materials in the coating fluid, or otherwise having to use undesirable conditions with respect to temperature (viscosity typically decreases with increasing T), pH (viscosity typically decreases with reducing pH) or ionic strength (adding salts typically causes viscosity to decrease).

High purity gelatins are generally required for imaging applications. Currently the most commonly employed manufacturing process for obtaining high purity gelatins involves demineralization of a collagen containing material, typically cattle bone (ossein), followed by extended alkaline treatment (liming) and finally gelatin extractions with water of increasing temperature as described in U.S. Pat. Nos. 3,514,518 and 4,824,939. The gelatin produced by this process, commonly referred to as lime processed ossein gelatin, has existed with various modifications throughout the gelatin industry for a number of years. The liming step of this process requires up to 60 days or more, the longest step in the approximately 3 month process of producing gelatin. The hydrolyzed collagen is extracted in a series of steps to obtain several gelatin fractions with varying molecular weights. In order to obtain gelatin of desired molecular weight to provide suitable coating solution viscosities, these fractions can be further hydrolyzed by high temperature hydrolysis. The fractions are then blended to obtain the appropriate molecular weight for photographic use. U.S. Pat. No. 5,908,921 describes a relatively new process for the preparation of photographic grade gelatin, where the agent for hydrolysis is a strong alkali, such as sodium or potassium hydroxide. The reaction rate is disclosed to be from 10 to 120 hours (substantially faster than the prior lime processes), after which a single extraction step yields a single batch of gelatin, which is then purified and deionized. The characteristics of the gelatin produced are that it has a high gel strength and narrow molecular weight distribution compared to gelatins produced by the conventional process where lime is used as the agent for hydrolysis. There is no disclosure in U.S. Pat. No. 5,908,921, however, regarding any possible impact use of the gelatin produced by such process may have on aqueous coating fluids containing such gelatin and dispersed colloidal material.

SUMMARY OF THE INVENTION

In accordance with the invention, an aqueous coating fluid is described comprising gelatin at a concentration of at least 1 wt % and a colloidal particle dispersed material phase at a volume fraction of at least 0.01, wherein at least 20% of the gelatin comprises a gelatin prepared from hydrolysis of ossein using sodium or potassium hydroxide.

The present invention enables increasing the concentrations of a coating fluid containing gelatin and dispersed sub-micron colloidal materials, reducing the size of the sub-micron colloidal materials in such a coating fluid, and/or including higher molecular weight gelatin in such a coating fluid without detrimentally increasing the viscosity of such fluids. The invention further enables reducing the viscosity of an aqueous coating fluid containing gelatin and dispersed insoluble colloidal material, without needing to reduce the concentration of gelatin or colloidal materials, increase the size of the sub-micron colloidal materials, and/or reduce the molecular weight of the gelatin. Each such advantage may be achieved either individually, or in combinations to varying extents, without the need to fundamentally change the composition of the materials in the coating fluid.

DETAILED DESCRIPTION OF THE INVENTION

Aqueous coating fluids in accordance with the invention comprise at least 1 wt % gelatin, and at least 0.01 volume fraction of a colloidal particle dispersed material phase. The dispersed material may be a dispersion of any colloidal organic or inorganic material useful in imaging elements, and in particular photographically useful materials, such as dispersed photographic coupler drops, UV-absorbers, scavengers of oxidized developer, silver halide grains, dye particles or other materials needed for other functions in an imaging element, such as polymer latexes and silica particles. The invention is particularly useful with respect to coating fluids comprising a colloidal dispersed material phase wherein the number mean particle diameter of dispersed colloidal material comprising at least 0.01 volume fraction is less than 1 micrometer, and more particularly less than 0.3 micrometer, and more preferably where dispersed colloidal material of such mean particle sizes comprise a volume fraction of the coating fluid of at least 0.03, as such coating fluids are generally more liable to otherwise result in higher than desired coating viscosities as a result of interactions between the gelatin and the dispersed material phase. Preparation of colloidal dispersions of hydrophic materials for use in the coating fluids of the invention is itself not critical, and any known dispersion forming techniques (e.g., high pressure emulsification, mill grinding, precipitation, etc.) may be used.

High purity gelatins are required for imaging/photographic applications. One gelatin property of interest is absorbance at 420 nm (A420), commonly know as color. The lower the A420 of gelatin the clearer the gelatin layer is in coated products. The A420 of gelatin is one of the defining factors for determining applicability of the gelatin for imaging applications. Edible gelatins are typically higher than photographic gelatins in A420. Two other gelatin properties critical to imaging applications are viscosity and gel strength or Bloom. Ideally, use of a gelatin with relatively high gel strength and low viscosity would be advantageous to coated products, in that high gel strength is desired for gelatin setting properties, while coating speeds could be increased with lower viscosity gelatins (through lower viscosity at same concentration increasing the onset of air entrainment or lower wet laydown at same low-shear viscosity reducing the energy required to remove the water). Due to variable bond breakage during manufacture, gelatin is composed of a distribution of polypeptides of varying molecular weights. Aqueous size exclusion chromotagraphy provides a method of analysis for determining the gelatin molecular weight distribution. This distribution is described as containing the following fractions; high molecular weight or HMW (>250 kD); Beta (250–150 kD); Alpha (150–50 kD); Subalpha (50–20 kD); and low molecular weight or LMW (20–4 kD). In general, high gel strength correlates with high gelatin alpha fraction content, and high viscosity correlates with high gelatin HMW fraction content. The viscosity of a gelatin solution at a specified concentration is itself often used to characterize the mean molecular weight of a particular gelatin sample. Typical alkaline processed bone gelatins contain relatively high gel strength and high viscosity. Gelatin viscosity can be controlled during the gelatin manufacturing process with heat treatment. Heat treatment, however, reduces both gel strength and viscosity. Typical gel strengths are from 250 to 300 Bloom and typical viscosities are from 5 to 15 mPa.s (for a 6.16 wt % gelatin solution, measured at 40 C.).

At least 20% of the gelatin of an aqueous coating fluid comprising gelatin and a colloidal dispersed material phase in accordance with the invention comprises a gelatin prepared from a process comprising hydrolysis of ossein utilizing a caustic sodium or potassium hydroxide solution to produce gelatin from a collagen containing material, such as described in U.S. Pat. No. 5,908,921, the disclosure of which is incorporated by reference herein. The process for the manufacture of gelatin as taught in U.S. Pat. No. 5,908,921 includes providing a collagen containing material and demineralizing the collagen containing material to produce ossein which is homogenized or ground. The ossein is added to a water solution of sodium hydroxide or potassium hydroxide at a concentration of at least 4% by weight and a swelling restraining salt (ie. sodium sulfate) at a concentration of at least 3% by weight for a time sufficient (typically 10 to 120 hours) to form a reacted slurry. The slurry is heated at a temperature of at least 45 C. for a time sufficient (typically at least 30 minutes) to produce a gelatin containing solution. The gelatin containing solution is clarified by raising the pH of the solution to greater than 9.8. A sulfate salt of a divalent or trivalent metal is added to the gelatin solution to reduce the pH to between 7.0 and 8.0. An acid, preferably phosphoric, is added to the solution to reduce the pH to between 5.0 and 6.0. A polymeric flocculant is added to the gelatin containing solution at a weight percent of 0.1 based on the dry weight of the gelatin to form a floc which is removed. Following extraction and clarification the gelatin solution is filtered, oxidized or deionized to achieve desired levels of microconstituents, prior to concentration and drying. The rate of reaction with the collagen is a function of caustic concentration, salt concentration, temperature and time. The process is further specifically illustrated by Example 1 of U.S. Pat. No. 5,908,921.

Typical collagen containing materials include skins, bones and hides (i.e., any connective tissue of an animal body). Sources of animal bodies include cattle, pigs and sheep. Cattle bone is preferred, although other sources of bone can be effectively utilized in the present invention. A continuous process for leaching cattle bone is described in U.S. Pat. No. 4,824,939, incorporated herein by reference. In this process the bovine bone is placed into contact with an acid, typically hydrochloric acid. The acid reacts with the minerals contained in the bone to form soluble products, such as calcium chloride and phosphoric acid. These products are leached out of the bone and removed, typically as calcium hydrogen phosphate dihydrate. The demineralized bone or ossein is one source of collagen from which gelatin can be extracted.

A gelatin prepared by hydrolysis of ossein using sodium or potassium hydroxide as described above and which is employed in the coating fluids of the invention is hereafter referred to as a "solubilized collagen" gelatin, as collagen from the source material is completely solubilized. Gelatin obtained therefrom is dissolved in a single extraction, and the described process advantageously creates a very uniform gelatin with minimal time and energy. The extracted gelatin may be purified through the use of a clarification process and desalted, typically using ultrafiltration or electrodialysis technology. Although the molecular weight of the gelatin obtained may be relatively high (such as obtained in U.S. Pat. No. 5,908,921 Example 1), the proteolytic degradation of gelatin (such as disclosed, e.g., in U.S. Pat. Nos. 5,919, 906, 6,080,843, and 6,100,381) can be advantageously used to reduce the molecular weight to a desired range. The characteristics of the gelatin produced, using these methods is that it has a relatively high gel strength and narrow molecular weight distribution compared to gelatins produced by the conventional process where lime is used as the agent for hydrolysis. It has been surprisingly found that use of solubilized collagen gelatin with such relatively narrow molecular weight distribution in aqueous coating fluids with a colloidal dispersed material phase in accordance with the invention enables relative improvements in obtaining a desired coating fluid viscosity.

In a particular embodiment of the invention, coating fluids comprising a colloidal particle dispersed material phase and a solubilized collagen gelatin which has a solution viscosity of greater than 3 mPa.s, more preferably greater than 4 mPa.s, where the solution viscosity is that of a 6.16 wt % gelatin solution, measured at 40 C., may advantageously be formulated without generating an undesirable coating fluid visosity observed with use of solely conventional lime-processed gelatins of similar solution viscosities in such coating fluids.

While aqueous coatings fluids in accordance with the invention comprise at least 1 wt % gelatin, the advantages provided by the invention are particularly applicable to higher concentration coating fluids, such as coating fluids comprising 3 wt % gelatin or more, preferably 4 wt % gelatin or more, and especially 5 wt % gelatin or more, which contain a colloidal particle dispersed material phase at a volume fraction of at least 0.01, preferably at least 0.03. Replacement of the gelatin in a coating fluid with a solubilized collagen gelatin in accordance with the invention provides a manufacturing improvement proportional to the fraction of solubilized collagen gelatin present. Thus, while the present invention is broadly directed towards the use of solubilized collagen gelatin in an amount of at least 20% of the gelatin in the coating fluid, it is preferable to have at least 30%, more preferably at least 40%, and most preferable at least 50% of solubilized collagen gelatin as the gelatin in the coating fluids of the invention. In a specific embodiment of the invention, the coating fluid may further comprise an anionic polymeric thickener where desired, e.g., at a concentration above 0.01% wt %. The advantages of the invention are applicable to coating fluids prepared for multilayer slide bead coating processes such as described in U.S. Pat. No. 2,716,419 as well as multilayer slide curtain coating processes such as described in U.S. Pat. No. 3,508,947.

Gelatin layers of imaging elements are frequently desirably cross-linked or hardened by reaction with a gelatin hardener in order to improve the physical properties of the layer. In addition to providing coating fluid viscosity advantages, the use of solubilized collagen gelatin in combination with certain effective amounts of gelatin hardener in imaging elements has been found to enable relative improvements in the wet mechanical strength of an imaging element comprising gelatin as a binder, without needing to increase the amount of chemical crosslinker with respect to the gelatin. Imaging elements comprising a specified level of solubilized collagen gelatin in one or more hydrophilic colloid layer thereof in combination with a specified effective level of gelatin hardener per gram of gelatin are described in commonly assigned, concurrently-filed, co-pending application U.S. Ser. No. 10/158,656 (Kodak Docket 83063AJA), the disclosure of which is incorporated herein by reference. The hardener in such imaging elements may be delivered through the coating fluid comprising the solubilized collagen gelatin, or a separate hardener-bearing layer coated therewith.

Coating fluids comprising gelatin and a colloidal particle dispersed hydrophic material phase in accordance with the invention may additionally comprise effective levels of any conventional hardener. A further advantage to the use of solubilized collagen gelatin in aqueous coating fluids is that for coating fluids comprising gelatin and gelatin hardener which have similar concentrations and viscosities, the time for formation of gel slugs to be formed in a hardener-bearing coating fluid may be significantly extended when a solubilized collagen gelatin is employed rather than a conventional lime processed gelatin. Coating fluids containing specified levels of solubilized collagen gelatin and gelatin hardener are described in commonly assigned, concurrently-filed, co-pending application U.S. Ser. No. 10/158,681 (Kodak Docket 83293AJA), the disclosure of which is incorporated herein by reference.

Coating fluids of the invention may be employed in the manufacture of many different types of imaging elements, depending on the particular use for which they are intended. Details with respect to the composition and function of a wide variety of different imaging elements are provided in U.S. Pat. No. 5,300,676 and references described therein. Such elements include, for example, photographic, electrophotographic, electrostatographic, photothermographic, migration, electrothermographic, dielectric recording and thermal-dye-transfer imaging elements. Layers of imaging elements other than the image-forming layer are commonly referred to auxiliary layers. There are many different types of auxiliary layers such as, for example, subbing layers, backing layers, interlayers, overcoat layers, receiving layers, stripping layers, antistatic layers, transparent magnetic layers, and the like.

The coating fluids of this invention in particular may be used in the manufacture of photographic elements, such as photographic films, photographic papers or photographic glass plates, in which the image-forming layer is a radiation-sensitive silver halide emulsion layer. The thickness of the support is not critical. Film support thickness of 2 to 10 mil (0.06 to 0.30 millimeters), and thicker paper supports, e.g., typically can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer. The emulsion layers typically comprise a film-forming hydrophilic colloid. The most commonly used of these is gelatin and a solubilized collagen gelatin as described above is a particularly preferred material for use in photographic emulsion layers in such embodiments.

Photographic imaging elements can be black and white, single color or multicolor photographic elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer. Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired. Dye-image-providing materials employed with conventional color photographic materials designed for processing with a separate developing solution are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support). Photographic elements may also usefully include a magnetic recording material as described in Research Disclosure, Item 34390, November 1992, or a transparent magnetic recording layer such as a layer containing magnetic particles on the underside of a transparent support as in U.S. Pat. Nos. 4,279,945 and 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical. The present invention also contemplates the use of photographic imaging elements in accordance with of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in imaging elements, reference will be made to Research Disclosure, September 1994, Number 365, Item 36544, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

Silver halide emulsions which may be employed in photographic imaging elements may be negative working, such as surface sensitive emulsions or unfogged internal latent image forming emulsions, or positive working emulsions of internal latent image forming emulsions (that are either fogged in the element or fogged during processing). With negative working silver halide a negative image can be formed; optionally, a positive (or reversal) image can be formed although a negative image is typically first formed in the reversal process. Suitable emulsions and their preparation as well as methods of chemical and spectral sensitization are described in Sections I through V. Color materials and development modifiers are described in Sections V through XX. Vehicles (which can be used in combination with solubilized collagen gelatin in photographic imaging elements in accordance with the invention) are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

Photographic imaging elements may also use colored couplers (e.g. to adjust levels of interlayer correction) and masking couplers such as those described in EP 213 490; Japanese Published Application 58-172,647; U.S. Pat. No. 2,983,608; German Application DE 2,706,117C; U.K. Patent 1,530,272; Japanese Application A-113935; U.S. Pat. No. 4,070,191 and German Application DE 2,643,965. The masking couplers may be shifted or blocked.

Photographic imaging elements may also contain materials that accelerate or otherwise modify the processing steps of bleaching or fixing to improve the quality of the image. Bleach accelerators described in EP 193 389; EP 301 477; U.S. Pat. Nos. 4,163,669; 4,865,956; and 4,923,784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912,025); anti-fogging and anti color-mixing agents such as derivatives of hydroquinones, aminophenols, amines, gallic acid; catechol; ascorbic acid; hydrazides; sulfonamidophenols; and non color-forming couplers.

Imaging elements may also contain other filter dye layers comprising colloidal silver sol or yellow and/or magenta filter dyes and/or antihalation dyes (particularly in an undercoat beneath all light sensitive layers or in the side of the support opposite that on which all light sensitive layers are located) either as oil in water dispersions, latex dispersions or as solid particle dispersions. Additionally, they may be used with "smearing" couplers (e.g. as described in U.S. Pat. No. 4,366,237; EP 096 570; U.S. Pat. Nos. 4,420,556; and 4,543,323.) Also, the couplers may be blocked or coated in protected form as described, for example, in Japanese Application 61/258,249 or U.S. Pat. No. 5,019,492.

Photographic imaging elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346,899; 362,870; 365,252; 365,346; 373,382; 376,212; 377,463; 378,236; 384,670; 396,486; 401,612; 401,613. DIR compounds are also disclosed in "Developer-Inhibitor-Releasing (DIR) Couplers for Color Photography," C. R. Barr, J. R. Thirtle and P. W. Vittum in Photographic Science and Engineering, Vol. 13, p. 174 (1969), incorporated herein by reference.

It is also contemplated that the present invention may be employed to obtain reflection color prints as described in Research Disclosure, November 1979, Item 18716, available from Kenneth Mason Publications, Ltd, Dudley Annex, 12a North Street, Emsworth, Hampshire P0101 7DQ, England, incorporated herein by reference. The emulsions and materials to form imaging elements may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906,559); with ballasted chelating agents such as those in U.S. Pat. No. 4,994,359 to reduce sensitivity to polyvalent cations such as calcium; and with stain reducing compounds such as described in U.S. Pat. Nos. 5,068,171 and 5,096,805. Other compounds useful in imaging elements are disclosed in Japanese Published Applications 83-09,959; 83-62,586; 90-072,629; 90-072,630; 90-072,632; 90-072,633; 90-072,634; 90-077,822; 90-078,229; 90-078,230; 90-079,336; 90-079,338; 90-079,690; 90-079,691; 90-080,487; 90-080,489; 90-080,490; 90-080,491; 90-080,492; 90-080,494; 90-085,928; 90-086,669; 90-086,670; 90-087,361; 90-087,362; 90-087,363; 90-087,364; 90-088,096; 90-088,097; 90-093,662; 90-093,663; 90-093,664; 90-093,665; 90-093,666; 90-093,668; 90-094,055; 90-094,056; 90-101,937; 90-103,409; 90-151,577.

Silver halide used in photographic imaging elements may be silver iodobromide, silver bromide, silver chloride, silver chlorobromide, silver chloroiodobromide, and the like. For example, in one particular embodiment, the silver halide used in photographic imaging elements of the present invention may contain at least 90 mole % silver chloride or more (for example, at least 95%, 98%, 99% or 100% silver chloride). The type of silver halide grains preferably include polymorphic, cubic, and octahedral. The grain size of the silver halide may have any distribution known to be useful in photographic compositions, and may be either polydipersed or monodispersed.

Tabular grain silver halide emulsions may also be used. Tabular grains are those with two parallel major faces each clearly larger than any remaining grain face (e.g., ECD/t is at least 2, where ECD is the diameter of a circle having an area equal to grain projected area and t is tabular grain thickness), and tabular grain emulsions are those in which the tabular grains account for at least 50 percent, preferably at least 70 percent and optimally at least 90 percent of total grain projected area. The tabular grains can account for substantially all (e.g., greater than 97 percent) of total grain projected area. The tabular grain emulsions can be high aspect ratio tabular grain emulsions—i.e., ECD/t>8; intermediate aspect ratio tabular grain emulsions—i.e., ECD/t=5 to 8; or low aspect ratio tabular grain emulsions—i.e., ECD/t=2 to 5. The emulsions preferably typically exhibit high tabularity (T), where T (i.e., ECD/$t^2$)>25 and ECD and t are both measured in micrometers ($\mu$m). The tabular grains can be of any thickness compatible with achieving an aim average aspect ratio and/or average tabularity of the tabular grain emulsion. Preferably the tabular grains satisfying projected area requirements are those having thicknesses of <0.3 $\mu$m, thin (<0.2 $\mu$m) tabular grains being specifically preferred and ultrathin (<0.07 $\mu$m) tabular grains being contemplated for maximum tabular grain performance enhancements. When the native blue absorption of iodohalide tabular grains is relied upon for blue speed, thicker tabular grains, typically up to 0.5 $\mu$m in thickness, are contemplated. Tabular grains formed of silver halide(s) that form a face centered cubic (rock salt type) crystal lattice structure can have either {100} or {111} major faces.

Silver halide grains may be prepared according to methods known in the art, such as those described in Research Disclosure I and James, The Theory of the Photographic Process. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

Silver halide grains may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in Research Disclosure I and the references cited therein.

Photographic imaging elements provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in Research Disclosure I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in Research Disclosure I. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80 C., as described in Research Disclosure I, Section IV (pages 510–511) and the references cited therein.

The silver halide may be sensitized by sensitizing dyes by any method known in the art, such as described in Research Disclosure I. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic imaging elements are preferably imagewise exposed using any of the known techniques, including those described in Research Disclosure I, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic imaging elements can be processed in any of a number of well-known photographic processes utilizing any of a number of well-known processing compositions, described, for example, in Research Disclosure I, or in T. H. James, editor, The Theory of the Photographic Process, 4th Edition, Macmillan, N.Y., 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are: 4-amino N,N-diethylaniline hydrochloride, 4-amino-3-methyl-N,N-diethylaniline hydrochloride, 4-amino-3-methyl-N-ethyl-N-(b-(methanesulfonamido)ethylaniline sesquisulfate hydrate, 4-amino-3-methyl-N-ethyl-N-(b-hydroxyethyl)aniline sulfate, 4-amino-3-b-(methanesulfonamido)ethyl-N,N-diethylaniline hydrochloride and 4-amino-N-ethyl-N-(2-methoxyethyl)-m-toluidine di-p-toluene sulfonic acid. Development is followed by bleach-fixing, to remove silver or silver halide, washing and drying.

EXAMPLES

The following procedures were used to evaluate hydrophilic colloid coating fluid compositions, as described in the examples set forth below.

In the examples, the viscosity of aqueous gelatin solution coating fluids containing dispersed insoluble colloidal materials were compared for coating fluids containing conventionally-manufactured lime-hydrolysed ossein gelatin and solubilized collagen gelatin that had been manufactured by a strong-alkali process as described in U.S. Pat. No. 5,908,921. During manufacture, all conventional gelatins and solubilized collagen gelatins samples had been deionised with mix-bed ion-exchange resins and had been adjusted from the isoelectric pH at 4.9 to pH 5.65–5.85 with NaOH or KOH. The gelatins contain approximately 11% moisture, which has not been accounted for in the concentrations quoted.

The viscosity of a gelatin solution is controlled primarily by the gelatin concentration and the gelatin mean molecular weight. The mean molecular weight can be difficult to determine precisely. Here, the viscosity of a 20% w/w gelatin solution at 45° C. ($\eta 20\%$) is used to characterise the mean molecular weight (MW). The gelatins may also be characterised by the gel strength or bloom. The gel strength is measured for a 6.16% dry weight gelatin after 24 hours hold at 10.0° C. It is the weight in grams required to depress a plunger (of 0.5" diameter, with a $1/64^{th}$" radius of curvature at the bottom) by 4 mm.

Measurement of Viscosity of Fluids Containing Gelatin and Colloidal Particles The viscosity at 45° C. was measured as a function of applied shear (from a stress of 0.05 Pa to a rate approaching 10,000 $s^{-1}$) with a Bohlin CS50 controlled-stress rheometer using a bob-and-cup (Bohlin C2.3/26) geometry. All fluids studied had a Newtonian viscosity at low shear. For materials which also exhibited shear thinning, the data were fitted with the Carreau-Yasuda model and the value of the limiting low-shear Newtonian viscosity, $\eta(0)$, is quoted.

| $\eta(\gamma) = \eta(0)[1 + (\lambda\gamma)^a]^{(n-1)/a}$ | Carreau-Yasuda model |
|---|---|

Where the $\eta(\gamma)$ is viscosity at shear rate $\gamma$, $\lambda$ is the relaxation time, n is the power-law index and a is an exponent describing the transition from Newtonian to shear-thinning behavior.

Example 1

Viscosity of Coating Fluids Comprising Dispersed Polymer Latex Particles and Gelatin Samples with a Range of MW In this example, viscosity measurements were made for coating fluids comprising a small colloidal polymer latex and gelatin at constant solids composition for gelatins of a wide range of different mean molecular weight, where the viscosity of gelatin in solution is used as an indication of the mean molecular weight.

Two sets of gelatins were prepared for evaluating the viscosities in a first series (Series 1) of coating fluids containing a polymer latex. The first set was prepared from a parent gelatin A that was obtained using the solubilized collagen process described in U.S. Pat. No. 5,908,921. The second set was prepared from a parent gelatin B manufactured by the conventional lime hydrolysis process. The gelatins were also characterized by $\eta 6\%$, the viscosity of a 6.16% dry weight gelatin solution measured at 40° C. using a capillary viscometer.

Each parent gelatin was further hydrolyzed in order to prepare the two sets of gelatins of different solution viscosity. In each case, the method of hydrolysis employed was by enzymes. The specific enzyme used was a protease (Neutrase, manufactured by Novo Nordisk). The procedure used is as follows: A 20% solution of the parent gelatin is prepared at 50° C. 10 ppm of the Neutrase was added and the viscosity of the gelatin solution was monitored. When the desired viscosity was reached the solution temperature was raised to 80° C. and held for 10 minutes to deactivate the enzyme. The gelatins obtained were characterized using the above methods and their properties are shown in Table 1a.

TABLE 1a

Properties of gelatins used in Series 1

| Gelatin Sample | η6% (mPa · s) | Gel strength (g) | η20% (mPa · s) |
|---|---|---|---|
| Solubilized collagen gelatin | | | |
| A1 | 8.67 | 299 | 108 |
| A2 | 7.21 | 317 | 63.7 |
| A3 | 5.76 | 323 | 47.7 |
| A4 | 4.51 | 278 | 35.1 |
| A5 | 3.46 | 141 | 19.2 |
| Conventional lime processed gelatin | | | |
| B1 | 9.57 | 209 | 155 |
| B2 | 7.67 | 205 | 105 |
| B3 | 6.35 | 203 | 75.4 |
| B4 | 4.96 | 189 | 38.0 |
| B5 | 4.41 | 176 | 34.0 |
| B6 | 3.21 | 82 | 15.2 |

The coating fluids in the first series each contain 6% w/w gelatin and 14% w/w polymer latex (volume fraction approximately 14%), where the latex polymer is a random tri-co-polymer of the monomers: n-butyl acrylate, 2-acrylamido-2-methylpropane sulfonic acid, and 2-acetoacetoxyethyl methacrylate. In the first series, the diameter of the latex in water was measured to be 58 nm by photon correlation spectroscopy. A second series (Series 2) of coating fluids was made comprising another polymer latex dispersion of the same polymer composition, and either a solubilized collagen gelatin or a conventional lime processed gelatin similarly as in the first series. The coating fluid viscosity and the corresponding gelatin solution viscosity measured at 45° C. are given in Table 1b and Table 1c for the first and second series of experiments, respectively. While the latex particle size in the second series was not directly measured, the coating fluid viscosities were higher for a given gelatin solution viscosity in the first series of experiments, which behavior is consistent with the mean latex particle size being smaller in the first series than in the second series.

TABLE 1b

Viscosity of conventional gelatins and solubilized collagen gelatins compared as 20% w/w solution (η20%) and in coating fluid (η(0)) of 6% w/w gelatin with 14% w/w polymer latex. First series-gelatin characteristics given in Table 1a.

| Gelatin Sample | Solution viscosity, η20% (mPa · s) | Coating fluid viscosity η(0) (mPa · s) |
|---|---|---|
| Solubilized collagen gelatin | | |
| A1 | 108 | 52.4 |
| A2 | 63.7 | 30.2 |
| A3 | 47.7 | 18.6 |
| A4 | 35.1 | 11.5 |
| A5 | 19.2 | 6.0 |

TABLE 1b-continued

Viscosity of conventional gelatins and solubilized collagen gelatins compared as 20% w/w solution (η20%) and in coating fluid (η(0)) of 6% w/w gelatin with 14% w/w polymer latex. First series-gelatin characteristics given in Table 1a.

| Gelatin Sample | Solution viscosity, η20% (mPa · s) | Coating fluid viscosity η(0) (mPa · s) |
|---|---|---|
| Conventional lime processed gelatin | | |
| B1 | 155 | 133 |
| B2 | 105 | 80.2 |
| B3 | 75.4 | 42.1 |
| B4 | 38.0 | 19.1 |
| B5 | 34.0 | 14.6 |
| B6 | 15.2 | 6.4 |

TABLE 1c

Viscosity of conventional gelatins and solubilized collagen gelatins compared as 20% w/w solution (η20%) and in coating fluid (η(0)) of 6% w/w gelatin with 14% w/w polymer latex. Second series.

| Gelatin Sample | Solution viscosity, η20% (mPa · s) | Coating fluid viscosity η(0) (mPa · s) |
|---|---|---|
| Solubilized collagen gelatin | | |
| A6 | 173 | 72.7 |
| A7 | 152 | 54.4 |
| A8 | 146 | 50.3 |
| A9 | 93.5 | 33.8 |
| A10 | 79.9 | 27.9 |
| A11 | 71.2 | 20.3 |
| A12 | 62.3 | 20.3 |
| A13 | 38.7 | 11.4 |
| A14 | 37.2 | 11.2 |
| Conventional lime processed gelatin | | |
| B7 | 162 | 92.9 |
| B8 | 147 | 93.6 |
| B9 | 125 | 69.9 |
| B10 | 100 | 53.2 |
| B11 | 67.2 | 28.1 |
| B12 | 56.6 | 22.0 |
| B13 | 54.1 | 22.4 |
| B14 | 44.6 | 17.2 |

When comparisons are made within the same series (i.e. with the same batch of polymer latex), the coating fluids made with solubilized collagen gelatin have lower viscosity than those with conventional gelatins of the same solution viscosity (i.e., for a given solution viscosity η20%, the low-shear viscosity of the corresponding coating fluid is higher with conventional gelatins than with solubilized collagen gelatin).

Example 2

Viscosity of Similar MW Gelatins with Colloidal Silica

Coating fluids were made with a dispersion of colloidal silica of 12 nm particle diameter with an aluminised surface. The viscosity was compared of coating fluids made with conventional gelatin and solubilized collagen gelatin. These gelatin samples were chosen to have an identical solution viscosity η20% of 157 mPa.s. The gel strength of the conventional gelatin was 280 g and that of the solubilized collagen gelatin 335 g. The silica was in the form of a 30% w/w (volume fraction=0.16) suspension (Ludox AM, supplied by du Pont). The ionic content of the conventional gelatin had been adjusted to be identical to that of the solubilized collagen.

2a) Constant Ratio of Silica to Gelatin

Suspensions or coating solutions were prepared by mixing 77.8 g of 20% gelatin solution with 22.2 g Ludox AM and then diluting to the final concentration with water. The ratio of gelatin to silica in these fluids was 7:3 w/w. The low-shear viscosity values are given in Table 2a.

TABLE 2a

Low-shear viscosity of coating fluids at 7:3 gelatin:silica.

| Gelatin (wt %) | Silica Volume fraction | Low-shear viscosity (mPa · s) | | Viscosity Ratio (Conventional: Solubilized collagen) |
|---|---|---|---|---|
| | | Conventional | Solubilized collagen | |
| 15.5 | 0.035 | 455 | 368 | 1.24 |
| 15.0 | 0.034 | 398 | 319 | 1.25 |
| 12.5 | 0.029 | 200 | 155 | 1.29 |
| 10.0 | 0.023 | 92 | 71 | 1.29 |
| 7.5 | 0.017 | 38 | 33 | 1.14 |
| 5 | 0.01 | 16 | 14 | 1.13 |

Although solutions of the conventional gelatin and solubilized collagen gelatin under identical measurement conditions had the same viscosity, when small colloidal particles were introduced, the fluid containing the conventional gelatin had typically 10–30% higher viscosities at low shear. Therefore, when matching the viscosity of the samples at this gelatin:silica ratio, the concentration of the solubilized collagen gelatin-containing sample could be increased by approximately 7%, or a 7% water reduction could be realized.

2b) Constant Gelatin Concentration

Suspensions or coating fluids were prepared by adding colloidal silica (Ludox AM) and water to a 20% gelatin solution as described above. Here, the gelatin concentration was maintained at 10% w/w and the silica concentration varied. Solutions were made with the same gelatins described in 2a. The low-shear viscosity values are given in Table 2b.

TABLE 2b

Low-shear viscosity of coating fluids at 10% gelatin with different added silica concentrations.

| Silica (wt %) | Silica Volume fraction | Low-shear viscosity (mPa · s) | | Viscosity Ratio (Conventional: Solubilized collagen) |
|---|---|---|---|---|
| | | Conventional | Solubilized collagen | |
| 10 | 0.053 | 1110 | 535 | 2.08 |
| 8 | 0.044 | 447 | 234 | 1.91 |
| 6 | 0.032 | 182 | 106 | 1.72 |
| 4 | 0.021 | 82 | 51.3 | 1.60 |
| 2 | 0.01 | 36.7 | 29.5 | 1.24 |
| 0 | 0.00 | 19 | 20.6 | 0.92 |

The viscosity of the coating fluids made with the conventional gelatin was higher than those made with solubilized collagen gelatin. The difference in viscosity between the coating fluids increased with the silica concentration. Thus the use of solubilized collagen gelatins enables the reduction of the viscosity of coating fluids without having to reduce the mean molecular weight of the gelatin and is especially effective when the amount of dispersed particles is high.

Example 3

Comparison of Rheology of Color Paper Photographic Element Dispersion Coating Fluids Made with Conventional Gelatin and Solubilized Collagen Gelatin of Identical Viscosity The low-shear viscosity of coating fluids containing oil-in-water dispersions of organic photographically-useful materials (PUMs), such as color couplers, UV absorbers, etc., was determined. The parent PUM dispersions ("makes") had been formulated with conventional deionized (DI) gelatin. The "makes" were diluted with "bulk" gelatin and water to form a coating fluid. Two "bulk" gelatin samples with identical solution viscosity ($\eta 20\%=112$ mPa.s) were used for dilution: one conventional gelatin and one solubilized collagen gelatin. As the solubilized collagen gelatin sample contained a higher level of ions than the conventional gelatin, a second comparison coating fluid was made using conventional gelatin to which potassium had been added at 3480 ppm to the gelatin. The potassium was in the form of potassium sulphate, to match that in the solubilized collagen gelatin. Using this method, the dispersion component (volume fraction, particle size etc.) was constant and differences in viscosity were due to the effects of the different manufacturing processes (conventional and solubilized collagen) used in making the 'bulk' gelatin.

Sample Composition

A series of coating fluids was made comprising various PUM dispersions used in manufacture of a color paper photographic material. To these dispersion makes were added solutions of the conventional gelatin and the solubilized collagen gelatin to give separate sets of coating fluids identical in all but the process of manufacture of the added bulk gelatin. Structures for the various referenced compounds are given at the end of the specification.

Dispersion 1: A dispersion of interlayer scavenger compound DMBHQ was prepared by dissolving DMBHQ in solvent CS-2 (weight ratio of 1:1.829) and heating to 110° C. This oil phase was added to an aqueous gelatin solution containing deionized lime-processed bone gelatin, surfactant Alkanol-XC™ (Dupont), held at 80° C. The resulting mixture was subjected to a Brinkmann rotor-stator mixer, set at 8000 rpm for 2 minutes, and then homogenized by passing once through a multiple orifice device at 352 kg/cm², at a temperature of 80° C. The resulting dispersion had a concentration of DMBHQ of 8.08% w/w, 8.56% w/w gelatin, and 0.625% Alkanol-XC™, and had a particle size of 0.35 microns.

Dispersion 2: A dispersion of ultraviolet absorber compounds was prepared in a similar manner as Dispersion 1 by dissolving UV-1(Tinuvin 328®), UV-2 (Tinuvin 328®), and DMBHQ in CS-6 (weight ratio of 1:0.1765:0.322:0.3918 respectively) and heating to 116° C. The resulting dispersion had a concentration of UV-1 of 11.09% w/w, 8.70% w/w gelatin, and 0.70% Alkanol-XC™, and had a particle size of 0.33 microns.

Dispersion 3: A dispersion of cyan coupler was prepared in a similar manner as Dispersion 1 by dissolving coupler CC-1, coupler CC-2, and UV-1 in solvents CS-3 and CS-4, (weight ratio of 1:0.1111:1.530:0.625:1.879 respectively) at 145° C. The resulting dispersion had a concentration of CC-1 of 3.89% w/w, 8.00% w/w gelatin, and 0.90% Alkanol-XC™, and had a particle size of 0.2 microns.

Dispersion 4: A dispersion of magenta coupler was prepared in a similar manner as Dispersion 1 by dissolving coupler MC-1, stabilizers St-4 and St-3 in a mixture of solvents CS-2 and CS-5 (weight ratio of 1:0.192:1.317:1.048:0.538 respectively) at 135° C. The resulting dispersion had a concentration of MC-1 of 5.37% w/w, 7.90% w/w gelatin, and 0.625% Alkanol-XC™, and had a particle size of 0.2 microns.

Each of Dispersions 1–4 was chill-set and stored at 5° C. for later use.

Aqueous coating fluids A through D were prepared by combining chill-set Dispersions 1–4 (containing gelatin of the prior art), respectively, with gelatin (20% w/w aqueous solution), heated to 50° C. until molten and uniformly mixed. The general formula for these solutions is shown in Table 3a. The gelatins used in combination with the dispersions were lime-processed gelatin (i.e., conventional bulk gelatin), lime-processed gelatin with additional salts, or a solubilized collagen gelatin in accordance with the invention, as specified in Table 3b.

place of solubilized collagen gelatin as a 'bulk' gelatin. The difference was smallest at the lowest level of added colloid.

To give an estimate of the reduction in water content potentially available due to use of solubilized collagen gelatin in coating fluids in accordance with the invention, the sample of coating fluid C containing the conventional gelatin was diluted to give the same low-shear viscosity as that containing solubilized collagen gelatin. As shown in Table 3c, a water saving of approximately 5% may be obtained by changing the 39% of the total gelatin in the coating fluid from conventional to solubilized collagen of the same solution viscosity. The diluted coating fluids made with conventional gelatin were more shear thinning (had a lower power-law index) than that of the same $\eta(0)$ with solubilized TABLE 3a Composition of coating fluids.

| Coating fluid | Component | Mass of component in 100 g of coating fluid (g) | Gelatin in make (% w/w) | Total gelatin in coating fluid (% w/w) | Bulk gelatin as % of total gelatin (% w/w) | Colloidal material in coating fluid (% w/w) | Gelatin: Colloid wt Ratio |
|---|---|---|---|---|---|---|---|
| A | Total | | | 16.132 | 84.9% | 6.52 | 2.474 |
| | Dispersion 1 | 28.53 | 8.56 | 2.44 | | | |
| | 20% bulk gelatin | 68.46 | | 13.692 | | | |
| | WATER | 3.01 | | | | | |
| B | Total | | | 15.916 | 80.6% | 7.44 | 2.139 |
| | Dispersion 2 | 35.49 | 8.70 | 3.09 | | | |
| | 20% bulk gelatin | 64.13 | | 12.826 | | | |
| | WATER | 0.38 | | | | | |
| C | Total | | | 9.45 | 39.2% | 14.38 | 0.657 |
| | Dispersion 3 | 71.93 | 8.00 | 5.75 | | | |
| | 20% bulk gelatin | 18.5 | | 3.7 | | | |
| | WATER | 9.57 | | | | | |
| D | Total | | | 11.304 | 57.3% | 9.51 | 1.189 |
| | Dispersion 4 | 61.1 | 7.90 | 4.83 | | | |
| | 20% bulk gelatin | 32.37 | | 6.474 | | | |
| | WATER | 6.53 | | | | | |

Viscosity of Coating Fluids

Viscosity was measured as a function of applied shear at 45° C. All coating fluids exhibited shear thinning behavior and the data fitted with the Carreau-Yasuda model. The low-shear viscosity values are given in Table 3b.

TABLE 3b

Low shear viscosity (mPa · s) of coating fluids made with iso-viscous solutions of conventional gelatin or solubilized collagen gelatin as 'bulk' gelatin.

| | Low-shear viscosity (mPa · s) | | |
|---|---|---|---|
| Coating fluid | Solubilized collagen bulk gelatin | Conventional + $K_2SO_4$ bulk gelatin | Conventional bulk gelatin |
| A | 111 | 114 | 118 |
| B | 114 | 134 | 132 |
| C | 120 | 222 | 312 |
| D | 109 | 120 | 135 |

The above data indicate the viscosity of the coating fluids was 3–85% higher when conventional gelatin was used in collagen gelatin as the 'bulk' gelatin (Table 3c), with or without the compensating potassium levels.

TABLE 3c

Carreau-Yasuda fit parameters to describe the shear-thinning behavior of coating fluid C. The formulation with conventional gelatin was diluted to give the same low-shear viscosity as when the bulk gelatin was made by the solubilized collagen gelatin process.

| Bulk gelatin | $\eta(0)$ at 45° C. (mPa.s) | Dilution (% water added) | $\lambda$ (s) | a | n |
|---|---|---|---|---|---|
| Conventional | 127 | 11 | 1.49E−01 | 1.1 | 0.814 |
| Conventional + $K_2SO_4$ | 126 | 5 | 1.93E−01 | 1.1 | 0.834 |
| Solubilized collagen | 120 | 0 | 1.08E−01 | 1.5 | 0.849 |

Thus the use of solubilized collagen gelatins enables the reduction in water content of coating fluids containing colloidal materials without having to increase the viscosity of the coating fluid or to change the viscosity-mean molecular weight of the gelatin.

Example 4

Color Paper Photographic Element Made with Coating Fluids Comprising Solubilized Collagen Gelatin A color-negative imaging element on reflective support is prepared by coating aqueous coating solutions of the following layers on a resin-coated paper support. In the coating structure, a blue imaging layer comprising a yellow coupler mixed with a blue-sensitive chloro-iodide cubic emulsion (0.2 mole % iodide, 0.6 μm cubic edge length average grain size) is the first layer of a three-color photographic recording material on the support. The subsequent layers comprise, in order, a layer containing a scavenger for oxidized developer, a green imaging layer, a second scavenger layer, a red imaging layer, a uv absorbing layer and a protective gelatin super-coat. The green imaging layer comprises a dispersion of magenta coupler mixed with a green-sensitive chloride cubic emulsion (0.3 μm cubic edge length average grain size) while red-sensitized chloride emulsion (0.4 μm cubic edge length average grain size) is mixed with a dispersion of cyan couplers to form the red imaging layer. Details of the structure of the multilayer coating, including component coverages in each layer, are shown below.

Coating fluid A described in Example 3 is combined with a polymeric thickener solution and a hardener solution to form a final aqueous coating fluid in accordance with the invention for coating Layer 4 (Interlayer B). The hardener solution comprised bis(vinylsulphonyl)methane (BVSM) and the thickener solution comprised a water-soluble co-polymer of acrylamide (20% w/w) and sodium 2-acrylamido-2-methylpropane sulfonate (80% w/w). The final coating fluid contained a total of 6.93% w/w gelatin, of which 1.03% w/w was conventional DI gelatin from the parent dispersion 1, and 5.90% w/w gelatin was solubilized collagen gelatin. There was 2.80% w/w colloidally-dispersed organic material (approximately 2.8% volume fraction). The BVSM hardener was present at 55 micromoles per gram of coating fluid (796 micromoles per gram of gelatin).

Coating fluid B described in Example 3 in accordance with the invention is used directly for coating Layer 6 (UV layer).

Aqueous coating fluids C and D described in Example 3 comprising photographic couplers were combined in approximately 1:1 w/w ratios with molten gelatin solutions containing the above described silver chloride emulsions, sensitized to red and green light, respectively, to form final coating fluids for emulsion Layer 5 and Layer 3, respectively. The advantageous properties of the coating fluid of the invention are preserved.

The use of coating fluids in accordance with the invention as described for such layers enable reduced wet load upon coating while still achieving desired coating viscosities. Further benefit may be derived from the use of a solubilized collagen gelatin in coating fluids for the remaining layers of the described element, as well as use of such gelatin in the preparation of the photographic emulsions combined with the photographically useful material dispersion coating fluids.

| Coating structure | |
|---|---|
| Layer 7 (Supercoat) | |
| Ludox AM ® (DuPont) | 0.1614 g.m$^{-2}$ |
| Gelatin (acid-processed) | 0.6456 g.m$^{-2}$ |
| Layer 6 (UV Layer) | |
| Tinuvin-328 ® | 0.130 g.m$^{-2}$ |
| Tinuvin 326 ® | 0.023 g.m$^{-2}$ |
| DMBHQ | 0.042 g.m$^{-2}$ |
| CS-3 | 0.051 g.m$^{-2}$ |
| Gelatin | 0.525 g.m$^{-2}$ |
| Layer 5 (Red-sensitive Layer) | |
| Ag | 0.198 g.m$^{-2}$ |
| Coupler CC-1 | 0.232 g.m$^{-2}$ |
| Coupler CC-2 | 0.026 g.m$^{-2}$ |
| Tinuvin 328 ® | 0.355 g.m$^{-2}$ |
| CS-3 | 0.145 g.m$^{-2}$ |
| CS-4 | 0.436 g.m$^{-2}$ |
| Gelatin | 1.312 g.m$^{-2}$ |
| Layer 4 (Interlayer B) | |
| DMBHQ | 0.108 g.m$^{-2}$ |
| CS-2 | 0.197 g.m$^{-2}$ |
| Gelatin | 0.753 g.m$^{-2}$ |
| Hardener | 0.1175 g.m$^{-2}$ |
| Polymeric thickener | 0.046 g.m$^{-2}$ |
| Layer 3 (Green-sensitive Layer) | |
| Ag | 0.099 g.m$^{-2}$ |
| Coupler MC-1 | 0.208 g.m$^{-2}$ |
| St-4 | 0.040 g.m$^{-2}$ |
| St-3 | 0.274 g.m$^{-2}$ |
| CS-5 | 0.218 g.m$^{-2}$ |
| CS-2 | 0.112 g.m$^{-2}$ |
| Gelatin | 1.187 g.m$^{-2}$ |
| Layer 2 (Interlayer A) | |
| DMBHQ | 0.108 g.m$^{-2}$ |
| CS-2 | 0.197 g.m$^{-2}$ |
| Gelatin | 0.753 g.m$^{-2}$ |
| Layer 1 (Blue-sensitive Layer) | |
| Ag | 0.217 g.m$^{-2}$ |
| Coupler YC-1 | 0.414 g.m$^{-2}$ |
| St-1 | 0.173 g.m$^{-2}$ |
| St-2 | 0.025 g.m$^{-2}$ |
| St-4 | 0.099 g.m$^{-2}$ |
| CS-1 | 0.218 g.m$^{-2}$ |
| HQ-K | 0.0095 g.m$^{-2}$ |
| PHR | 0.0011 g.m$^{-2}$ |
| Gelatin | 1.244 g.m$^{-2}$ |
| Support | |

PHR = 2,5-dihydroxy-5-methyl-3-(1-piperidenyl)-2-cyclopenten-1-one
HQ-K = 2,5-dihydroxy-4-(1-methylheptadecyl)-benzenesulphonic acid (K salt)
DMBHQ = 2,5-di-(1,1,3,3-tetramethylbutyl)hydroquinone
Hardener = bis(vinylsulphonyl)methane (BVSM)
Polymeric thickener = co-polymer of acrylamide (20% w/w) and sodium 2-acrylamido-2-methylpropane sulfonate (80% w/w)

Stabilizer St-1 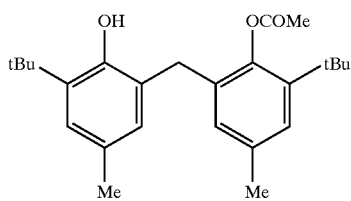
Stabilizer St-2 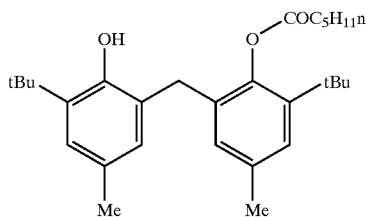
Stabilizer St-3 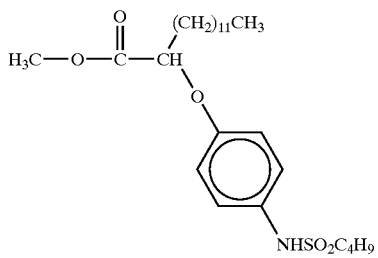
Stabilizer St-4 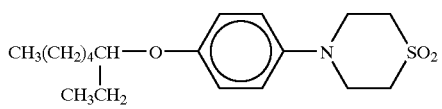
Solvent CS-1 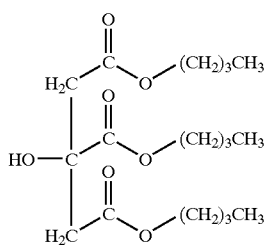
Solvent CS-2 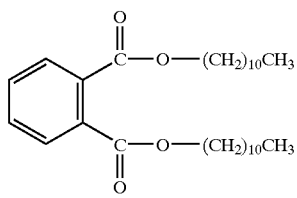
Solvent CS-3 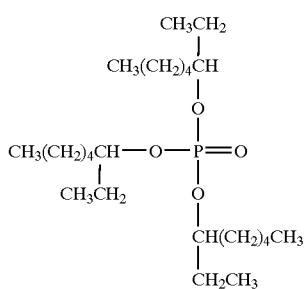

-continued
Solvent CS-4 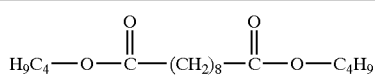
Solvent CS-5  $CH_3(CH_2)_7CH=CH(CH_2)_8-OH$
Coupler YC-1 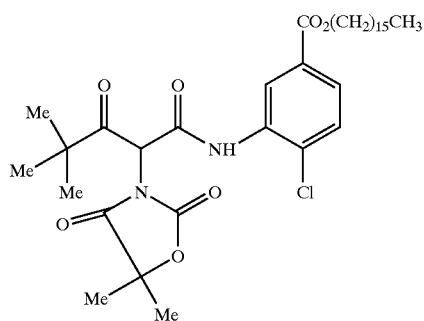
Coupler MC-1 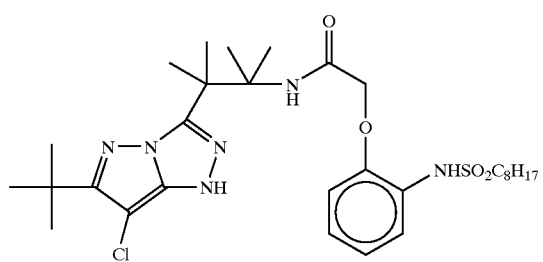
Coupler CC-1 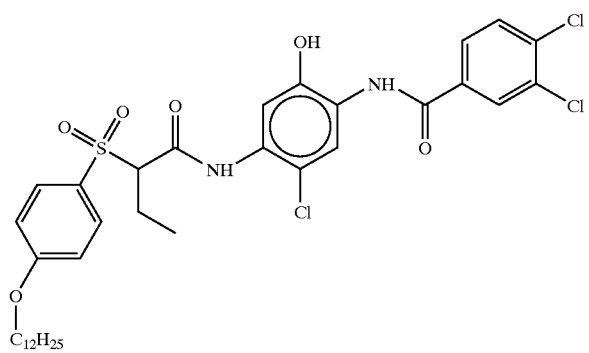
Coupler CC-2 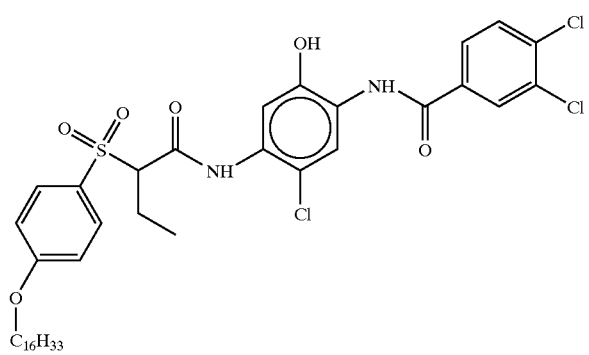

The invention has been described in detail with particular reference to certain preferred embodiments thereof, but it will be understood that variations and modifications can be effected within the spirit and scope of the invention.

What is claimed is:

1. An aqueous coating fluid comprising gelatin at a concentration of at least 1 wt % and a colloidal particle dispersed material phase wherein the number mean particle diameter of dispersed colloidal material comprising a volume fraction of at least 0.01 is less than 1 micrometer, and wherein at least 20% of the gelatin comprises a gelatin prepared from a single extraction of completely solubilized collagen obtained upon hydrolysis of ossein using a caustic solution containing at least 4% by weight of sodium or potassium hydroxide.

2. A coating fluid according to claim 1, wherein the volume fraction of dispersed material is at least 0.03.

3. A coating fluid according to claim 1, wherein the number mean particle diameter of the dispersed material is less than 0.3 micrometer.

4. A coating fluid according to claim 3, wherein the volume fraction of dispersed material is at least 0.03.

5. A coating fluid according to claim 1, wherein the volume fraction of dispersed material is at least 0.03.

6. A coating fluid according to claim 1, wherein at least 30% of the gelatin comprises a gelatin prepared from hydrolysis of ossein using sodium or potassium hydroxide.

7. A coating fluid according to claim 1, wherein at least 40% of the gelatin comprises a gelatin prepared from hydrolysis of ossein using sodium or potassium hydroxide.

8. A coating fluid according to claim 1, wherein at least 50% of the gelatin comprises a gelatin prepared from hydrolysis of ossein using sodium or potassium hydroxide.

9. A coating fluid according to claim 1, wherein the gelatin prepared from hydrolysis of ossein using sodium or potassium hydroxide is prepared by a process comprising:

providing a collagen containing material;

demineralizing the collagen containing material to produce ossein;

adding the ossein to a water solution containing at least 4% sodium hydroxide or potassium hydroxide and at least 3% sodium sulfate for a time sufficient to form a reacted slurry;

heating the slurry to at least 45 C. for a time sufficient to produce a solution containing gelatin;

raising the pH of the gelatin solution to greater than 9.8;

adding a sulfate salt of a divalent or trivalent cation to the gelatin solution to reduce the pH to between 7.0 and 8.0;

adding an acid to the gelatin solution to reduce the pH to between 5.0 and 6.0;

adding a polymeric flocculant to the gelatin solution in an amount of about 0.1 percent based on a dry weight of the gelatin to produce a floc;

removing the floc from the gelatin solution;

filtering the gelatin solution; and desalting the gelatin solution.

10. A coating fluid according to claim 1, comprising gelatin at a concentration of at least 3 wt %.

11. A coating fluid according to claim 1, comprising gelatin at a concentration of at least 4 wt %.

12. A coating fluid according to claim 1, comprising gelatin at a concentration of at least 5 wt %.

13. A coating fluid according to claim 1, wherein the gelatin prepared from hydrolysis of ossein using sodium or potassium hydroxide has a viscosity of greater than 3 mPa.s, where the viscosity is that of a 6.16 wt % gelatin solution, measured at 40 C.

14. A coating fluid according to claim 13, where the viscosity of the gelatin is greater than 4 mPa.s.

* * * * *